Oct. 26, 1926.

J. L. SCHLITT ET AL 1,604,240

LIQUEFACTION APPARATUS

Filed Feb. 5, 1926    2 Sheets-Sheet 1

INVENTOR
Joseph L. Schlitt and
Wolcott Dennis
BY
Pennie Davis Marvin & Edmonds
ATTORNEYS Oct. 26, 1926.

J. L. SCHLITT ET AL 1,604,240

LIQUEFACTION APPARATUS

Filed Feb. 5, 1926   2 Sheets-Sheet 2

INVENTOR
Joseph L. Schlitt and
Wolcott Dennis
BY
Pennie Davis Marvin & Edmonds
ATTORNEYS Patented Oct. 26, 1926.

1,604,240

UNITED STATES PATENT OFFICE.

JOSEPH L. SCHLITT AND WOLCOTT DENNIS, OF ELIZABETH, NEW JERSEY, ASSIGNORS TO AIR REDUCTION COMPANY, INCORPORATED, OF NEW YORK, N. Y., A CORPORATION OF NEW YORK.

LIQUEFACTION APPARATUS.

Application filed February 5, 1926. Serial No. 86,124.

This invention relates to apparatus for the liquefaction of gases, and particularly to an improved vaporizer for such apparatus.

In a well known type of liquefaction apparatus the initial separation of the gaseous mixture undergoing treatment is accomplished in the tubes of a vaporizer in the lower portion of the liquefaction column. The tubes are surrounded by a body of liquid produced by the operation and the liquid is vaporized by cooling and liquefying all or a portion of the gaseous mixture which enters and passes through the tubes. The liquefaction accomplished is selective, that is to say, the more readily condensable constituent of the gaseous mixture treated is present in the liquid produced in a larger proportion than in the gaseous mixture. The enrichment of the liquid in the more readily condensable constituent is further augmented by "backward return" of the liquid in contact with the entering gaseous mixture. As the liquid flows downwardly in the tubes a portion of the more readily vaporizable constituent thereof is vaporized and replaced by an equivalent amount of the more readily condensable constituent derived from the entering gaseous mixture. The result is a liquid which is thereafter rectified to complete the separation and a gas which consists substantially of the less readily condensable constituent.

It is the object of the present invention to provide an apparatus in which the maximum separation under the conditions mentioned can be accomplished by reason of the more complete contact of the liquid descending in the tubes with the entering gaseous mixture. The descending liquid, instead of falling more or less directly through the tubes, is retarded in its descent and the entering gaseous mixture is distributed to permit contact thereof with substantially all of the liquid, thus permitting the removal of a larger proportion of the less readily condensable constituent from the liquid and the consequent enrichment thereof in the more readily condensable constituent.

Further objects and advantages of the invention will be apparent as it is better understood by reference to the following specification and the accompanying drawing, in which—

The invention will be described hereinafter for the purpose of simplicity as it is applied to the separation of oxygen and nitrogen from the atmosphere, and the air treated will be considered as a binary mixture. Argon is present also in the air in small proportions and the argon accumulates either in the liquid produced by the operation or in the unliquefied gas, depending upon the conditions of operation. Its presence does not affect the operation of the apparatus herein considered. The quantities of other gases present in the atmosphere are likewise negligible from the standpoint of the present invention.

In carrying out the invention we apply to the selective liquefaction of the entering gaseous mixture the principles of rectification. The separation as accomplished in the apparatus heretofore used depends upon these principles inasmuch as the contact between the "backward return" liquid and the entering gaseous mixture in the tubes permits the separation of the less readily condensable constituent by exchanging a portion thereof in the liquid for a corresponding amount of the more readily condensable constituent in the gaseous mixture. The present invention employs these principles to a much greater extent with consequent advantage to the operation. For this purpose we utilize in place of the plain tubes which have been used heretofore in the vaporizer somewhat larger tubes containing suitable baffles, and in some cases with collectors for the liquid and means to distribute the entering gaseous mixture in contact therewith. The structure necessary to accomplish the purpose may be varied in form and arrangement consisting, for example, merely of a plurality of plates arranged in the tube so as to cause the liquid and the gaseous mixture to follow a tortuous path in opposite directions through the tube. The result may be accomplished also by introducing a plurality of twisted elements into each tube to provide an extended surface over which the descending liquid may flow while the ascending gaseous mixture is broken up into a plurality of streams which are caused to contact with the extended liquid surface. Likewise we can employ the usual arrangement of trays which are commonly found in rectification columns, each tube being furnished in this instance with partitions having openings therein with "hats" disposed over the openings so that the gaseous mixture rising through the tubes is brought into intimate contact with bodies of liquid which are held on the trays. These and other constructions can be employed with the advantage hereinbefore noted. An additional advantage is that the tubes may be of considerably larger diameter than those heretofore used, and consequently the difficulty of securing the large number of relatively small tubes in the vaporizer can be avoided.

Figure 1:
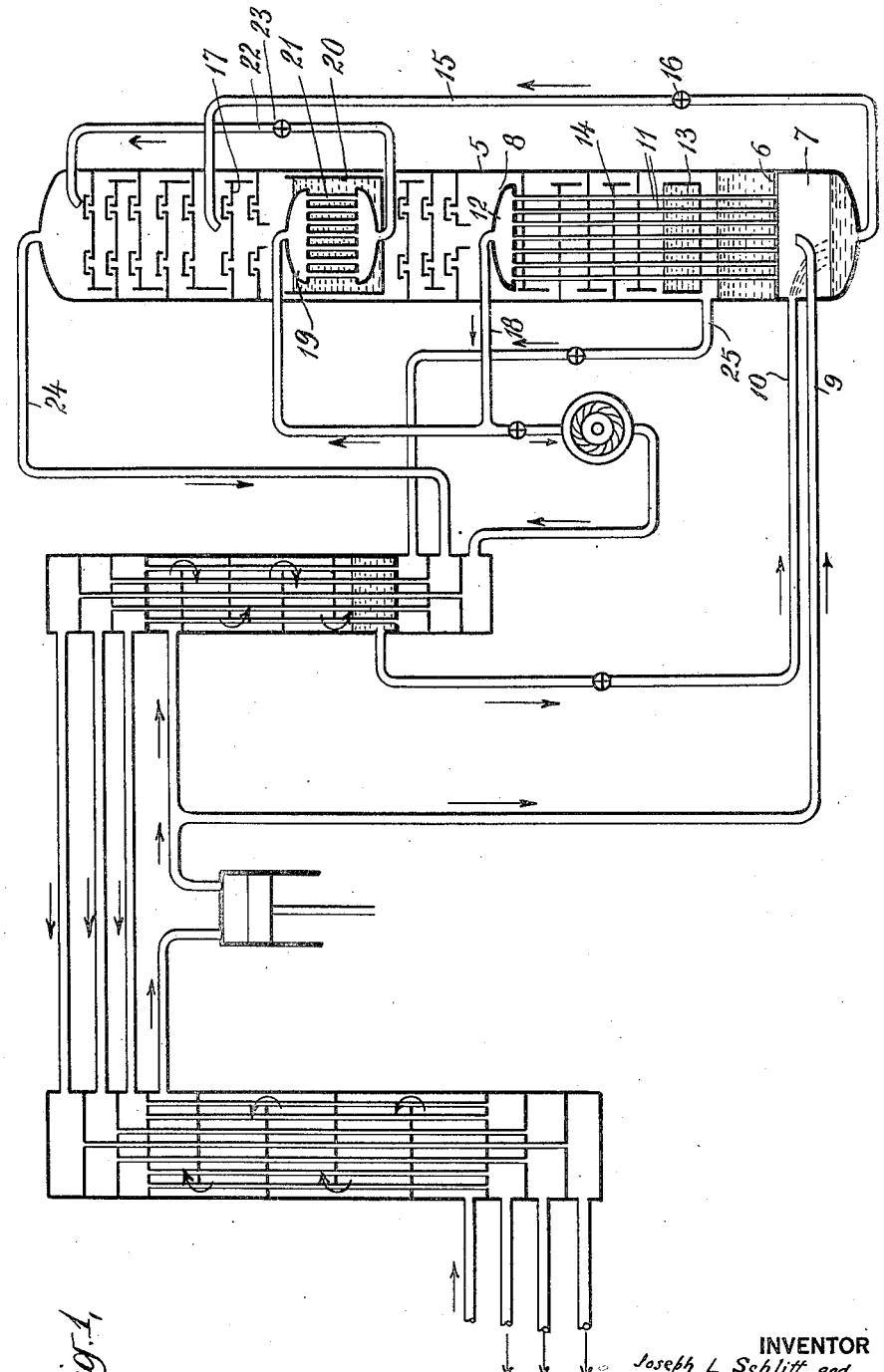
Fig. 1 is a diagrammatic illustration of a liquefaction column designed particularly for the separation of oxygen and nitrogen from the atmosphere.

The invention can be applied, for example, to an ordinary liquefaction column, of which one type is illustrated in Fig. 1 of the drawing. The column 5 is divided by a partition 6 into compartments 7 and 8. The gaseous mixture to be separated can be introduced after suitable compression and cooling to the compartment 7 through a pipe 9 and supplemental liquid from any suitable source can be introduced likewise through a pipe 10. The gaseous mixture passes upwardly through a plurality of tubes 11 of the vaporizer to a header 12. The tubes 11 are surrounded by bodies of liquid accumulated in the bottom of the compartment 8 in a receptacle 13 and upon trays 14 which surround the tubes. In passing through the tubes the gaseous mixture is liquefied selectively and the liquid produced returns in contact with the entering gaseous mixture and accumulates finally in the compartment 7. From the compartment 7 the liquid is delivered through a pipe 15 and pressure-reducing valve 16 to the upper part of the compartment 8 in which it flows downwardly over trays 17 of the usual type employed in rectification columns. In thus flowing downwardly in the column the liquid is subjected to vapors rising from the bottom of the compartment and a rectification is accomplished with resulting enrichment of the more readily condensable constituent in the liquid until this liquid is, for example, substantially pure oxygen. The unliquefied residual gas from the tubes 11, which in this case is substantially pure nitrogen, is delivered from the header 12 through a pipe 18 to a condenser 19 which is surrounded by a body of liquid accumulated in a receptacle 20 in the upper part of the compartment 8. In passing through the tubes 21 of the condenser the residual gas is liquefied and it passes thence through a pipe 22 and pressure-reducing valve 23 to the uppermost part of the column 5 where it flows downwardly over the trays 17 in contact with vapors rising through the column until it joins the liquid which is introduced through the pipe 15. The rectification in the uppermost part of the column ensures the removal of the more readily condensable constituent, for example oxygen, from the vapors rising in the column so that the effluent, consisting principally of nitrogen, for example, is delivered through a pipe 24 connected to the top of the column. A portion of the vapor produced at the bottom of the column by evaporation of the liquid surrounding the tubes 11 is withdrawn from the pipe 25 and is a product of the operation.

It will be understood that the usual apparatus for compressing, cooling and drying the entering gaseous mixture and suitable expansion devices can be employed in connection with the column. These features form no part of the present invention and are well known in the art and they are consequently not illustrated in the drawing.

Figure 2:
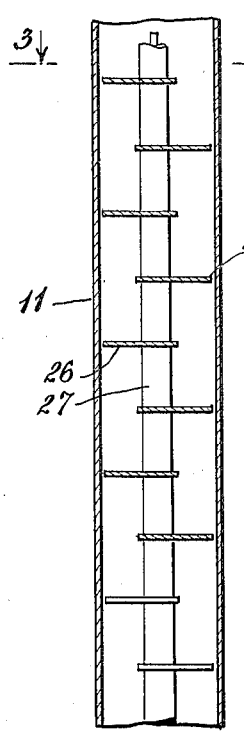
Fig. 2 is a longitudinal section through a vaporizer tube.
Figure 3:
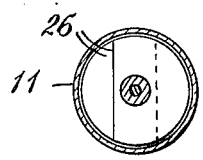
Fig. 3 is a cross-sectional view of such a tube.

The invention relates more particularly to the tubes 11 which, as illustrated in the remaining figures of the drawing, may include means to ensure the more complete contact of the entering gaseous mixture with the liquid produced in the tubes and flowing backwardly therein. Thus, in Figs. 2 and 3, the tubes 11 may include a plurality of baffles 26 supported in any desired manner as, for example, upon a central tube or rod 27. The arrangement of the baffles in this way permits the assembly and insertion thereof in the tubes in proper relation to permit the treatment of the gases and the backwardly flowing liquid in the manner best adapted to accomplish the objects of the invention. The baffles 26 may be semi-circular in shape as indicated in Fig. 3 and may loosely fit within the tube 11 so that the insertion thereof is facilitated. In this tube the entering gaseous mixture will follow a tortuous upward course and the liquid produced by condensation will accumulate and will flow downwardly over the baffles in contact with the rising gas. The more or less complete contact of the liquid with the gas facilitates the removal of the less readily condensable constituent from the liquid and the substitution therefor of an equivalent amount of the more readily condensable constituent.

Figure 4:
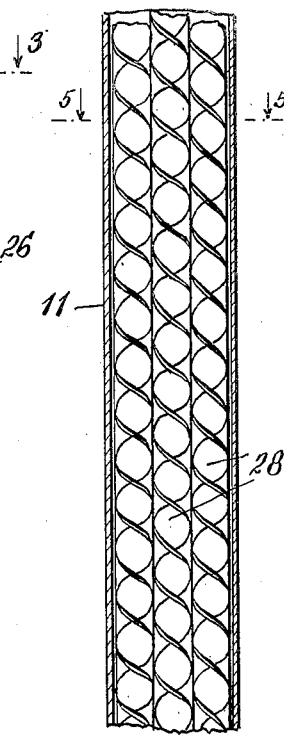
Fig. 4 is a longitudinal section through another form of the tube.
Figure 5:
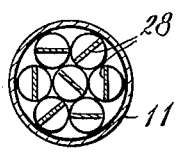
Fig. 5 is a cross-sectional view of the structure shown in Fig. 4.

Referring to Figs. 4 and 5, the tubes 11 may contain a plurality of spiral members 28 which may be made, for example, by suitably twisting a metal ribbon. The tube is substantially filled with these members and the gaseous mixture rising through the tubes is thus caused to follow a tortuous path while the large surface over which the liquid flows downwardly ensures the maximum contact of the liquid with the rising gases. The spiral members act as baffles and permit the accomplishment of the object of the invention.

Figure 6:
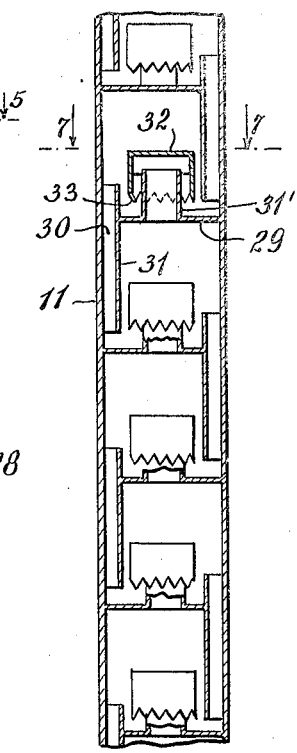
Fig. 6 is a longitudinal section through another tube embodying the invention.
Figure 7:
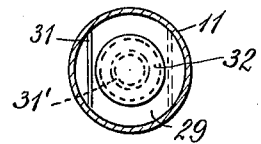
Fig. 7 is a cross-sectional view of the structure shown in Fig. 6.

In Figs. 6 and 7 the tubes 11 are divided by a partition 29 into separate compartments which communicate through passages 30 formed by baffle walls 31 which extend beneath the surface of the liquid which accumulates upon each partition and to the desired liquid level on the partition directly above it. Connection is also afforded by chimneys 31′ having hats 32 thereon with serrated edges 33. These hats are loosely disposed upon the chimneys to permit the gaseous mixture to rise therethrough and escape beneath the serrated edges which are below the surface of the accumulated bodies of liquid on the partitions. The liquid overflows to the successive partitions through the passages 30. This arrangement, which is similar to that employed in ordinary rectification columns, permits the distribution of the gaseous mixture through the accumulated liquid, and the enrichment of the liquid in the more readily condensable constituent is thus assured.

We are enabled by the use of the baffle arrangements described and other similar arrangements to improve materially the results obtained by selective liquefaction with "backward return". The vaporizer of an ordinary liquefaction column can be operated to provide liquid which is richer in oxygen, for example, or the capacity of the column can be increased because of the possibility of obtaining the necessary enrichment of the liquid with the gaseous mixture traveling at a higher velocity. These results are accomplished because of the greater efficiency of the vaporizer including tubes with means therein to facilitate the contact between the entering gaseous mixture and the descending liquid.

Various changes may be made in the details of the structure as illustrated herein without departing from the invention or sacrificing any of the advantages thereof.

We claim:—

1. In an apparatus for separating the constituents of gaseous mixtures by liquefaction, a column including a vaporizer section, a plurality of tubes extending through the vaporizer section, means for introducing a gaseous mixture to and for withdrawing a gaseous product from the tubes, and means within the tubes to retard the backward return of liquid formed therein in contact with the gaseous mixture.

2. In an apparatus for separating the constituents of gaseous mixtures by liquefaction, a column including a vaporizer section, a plurality of tubes extending through the vaporizer section, means for introducing a gaseous mixture to and for withdrawing a gaseous product from the tubes, means within the tubes to retard the backward return of liquid formed therein in contact with the gaseous mixture, and a rectifier above the vaporizer section to complete the separation of constituents of the liquid formed in the tubes thereof.

3. In an apparatus for separating the constituents of gaseous mixtures by liquefaction, a column including a vaporizer section, a plurality of tubes extending through the vaporizer section, means for introducing a gaseous mixture to and for withdrawing a gaseous product from the tubes and a plurality of baffles in each tube to retard the backward return of the liquid formed therein in contact with the gaseous mixture.

4. In an apparatus for separating the constituents of gaseous mixtures by liquefaction, a column including a rectifier, a vaporizer section below the rectifier and adapted to receive liquid therefrom, a plurality of tubes extending through the vaporizer section, means for introducing a gaseous mixture to and for withdrawing a gaseous product from the tubes, means within the tubes to retard the backward return of the liquid formed therein in contact with the gaseous mixture and means to deliver liquid formed in the tubes to the rectifier.

5. In an apparatus for separating the constituents of gaseous mixtures by liquefaction, a column including a vaporizer section, a plurality of tubes extending through the vaporizer section, means for introducing a gaseous mixture to and for withdrawing a gaseous product from the tubes, a plurality of baffles in each tube to retard the backward return of the liquid formed therein in contact with the gaseous mixture, and a rectifier above the vaporizer section to complete the separation of constituents of the liquid formed therein.

6. In an apparatus for separating the constituents of gaseous mixtures by liquefaction, a column including a rectifier, a vaporizer section below the rectifier and adapted to receive liquid therefrom, a plurality of tubes extending through the vaporizer section, means for introducing a gaseous mixture to and for withdrawing a gaseous product from the tubes, a plurality of baffles within the tubes to retard the backward return of the liquid formed therein in contact with the gaseous mixture and means to deliver liquid formed in the tubes to the rectifier.

7. In an apparatus for separating the constituents of gaseous mixtures by liquefaction, a column, a vaporizer section at the lower end of the column, a plurality of tubes extending through the vaporizer section, a header communicating with the upper ends of the tubes, means for withdrawing a gaseous product from the header, means for introducing a gaseous mixture to the tubes and means within the tubes to retard the backward return of liquid formed therein in contact with the gaseous mixture.

8. In an apparatus for separating the constituents of gaseous mixtures by liquefaction, a column, a vaporizer section at the lower end of the column, a plurality of tubes extending through the vaporizer section, a header communicating with the upper ends of the tubes, means for withdrawing a gaseous product from the header, means for introducing a gaseous mixture to the tubes and a plurality of baffles within the tubes to retard the backward return of liquid formed therein in contact with the gaseous mixture.

9. In an apparatus for separating the constituents of gaseous mixtures by liquefaction, a column, a vaporizer section at the lower end of the column, a plurality of tubes extending through the vaporizer section, a header communicating with the upper ends of the tubes, means for withdrawing a gaseous product from the header, means for introducing a gaseous mixture to the tubes, means within the tubes to retard the backward return of liquid formed therein in contact with the gaseous mixture and a rectifier above the vaporizer section to supply liquid thereto.

10. In an apparatus for separating the constituents of gaseous mixtures by liquefactions, a column, a vaporizer section at the lower end of the column, a plurality of tubes extending through the vaporizer section, a header communicating with the upper ends of the tubes, means for withdrawing a gaseous product from the header, means for introducing a gaseous mixture to the tubes, means within the tubes to retard the backward return of liquid formed therein in contact with the gaseous mixture, a rectifier above the vaporizer section to supply liquid thereto, and means to deliver liquid formed in the tubes to the rectifier.

In testimony whereof we affix our signatures.

JOSEPH L. SCHLITT.
WOLCOTT DENNIS.